United States Patent [19]
Mancini

[11] Patent Number: 6,141,903
[45] Date of Patent: *Nov. 7, 2000

[54] TREE STAPLE

[76] Inventor: James A. Mancini, P.O. Box 502, Springfield, N.J. 07081

[*] Notice: This patent is subject to a terminal disclaimer.

[21] Appl. No.: 09/018,203

[22] Filed: Feb. 3, 1998

[51] Int. Cl.$^7$ ..................................................... A01C 11/00
[52] U.S. Cl. .................................. 47/42; 111/2; 248/351
[58] Field of Search .................................... 47/42, 43, 44, 47/46, 47, 76, 58.1; 256/48, 58; 248/175, 156; 40/645; 52/40; 232/39

[56] References Cited

U.S. PATENT DOCUMENTS

| | | |
|---|---|---|
| 350,281 | 10/1886 | Wrightman . |
| 535,887 | 3/1895 | Brown . |
| 606,558 | 6/1898 | Ketchum .................................. 248/156 |
| 1,377,832 | 5/1921 | Hanner . |
| 1,560,404 | 11/1925 | Brown . |
| 4,026,094 | 5/1977 | Sasur . |
| 4,658,737 | 4/1987 | Weissberg ..................................... 47/42 |
| 4,894,950 | 1/1990 | Yukio et al. . |
| 5,473,839 | 12/1995 | Stidham . |

FOREIGN PATENT DOCUMENTS 4008-580-A1  3/1990  Germany .

Primary Examiner—Peter M. Poon
Assistant Examiner—Francis T. Palo
Attorney, Agent, or Firm—Watov & Kipnes, P.C.; Kenneth Watov

[57] ABSTRACT

A device for securing the root ball of newly planted trees and/or shrubs into proper position, for stabilizing the trees and/or shrubs to prevent shifting or toppling while the tree and/or shrub root systems are first developing. The device includes a horizontal cross member, and a series of prongs perpendicularly depending from the horizontal cross member. Two outer prongs are attached to the ends of the cross-member, and at least one, but preferable two or more shorter inner prongs are attached near the middle of the cross member in one configuration. At the time of planting, after the root ball of the tree is set into an appropriate hole, and the tree is in proper position, the prongs of the device are driven into the ground such that the outer prongs are retained in the firm portion of the soil, and the inner prongs engage the root ball. The outer prongs are of a sufficient length to be held securely in the soil, and the shorter prongs are arranged both in position and sized in length to engage the root ball securely. The device is driven into the soil deep enough for the top of the cross member to be flush with the soil.

12 Claims, 5 Drawing Sheets

TREE STAPLE

FIELD OF THE INVENTION

The present invention relates generally to devices for stabilizing newly planted trees and shrubs to prevent them from shifting or toppling while their root systems are first developing, and more particularly to devices to be used during planting, for securing the root balls of the newly planted trees or shrubs into proper position.

BACKGROUND OF THE INVENTION

Generally it is necessary to secure newly planted trees and shrubs in order to prevent them from shifting or toppling during the period before the planting's own root systems have developed sufficiently to provide stability. Shifting is particularly likely if large trees and shrubs are planted during wet or freezing weather. Newly planted shrubs or trees, which are subject to high winds may also be shifted out of position, or even toppled if not adequately supported. The period during which such support is beneficial to the planting may be significant depending on how quickly the root system develops.

Most conventional methods for providing support during the period when trees or large shrubs are first planted include driving two or more equally spaced stakes into the ground around the tree or large shrub and securing the trunk to the stakes with rope or wire. The stakes are usually wood for reasons of convenience and economy. The stakes may be in the form of short pegs that project only several inches from ground level, or may be in the form of posts that project several or more feet from ground level.

Conventional tree staking methods have several disadvantages. The stakes can be a dangerous hazard to people who may walk into, or trip on them. The stakes are difficult to mow and to trim around. The stakes and associated ropes or wires may work loose, and may require attention from time to time. The conventional methods of staking are unsightly. Once the root system is capable of supporting the plant on its own, the conventional tree staking method is no longer needed and should be removed, resulting in additional work and potentially an additional cost for professional nurserymen. Generally, the stakes deteriorate during the time they are in use, and cannot be used more than once, adding to the cost of the tree or shrub. Finally, the conventional methods are useful primarily with small to moderate sized trees and shrubs, and provide limited support for larger plantings.

For the foregoing reasons, there is a need for an improved device and method of installation, that can be installed at the time of planting, and that provides the required stabilization without the limitations of the conventional methods.

SUMMARY OF THE INVENTION

It is an object of this invention to provide a multi-pronged staple, of sufficient size to engage both the root ball and the surrounding undisturbed earth, that can provide stabilizing support for any size tree or shrub.

Another object of the invention is to provide a new planting stabilizing support without potentially hazardous ropes, wires, or stakes.

Another object of the invention is to provide a new planting stabilizing support system that is not difficult to mow and to trim around.

Another object of the invention is to provide a new planting stabilizing support that will not work loose over time, and requires little or no attention after installation.

Another object of the invention is to provide a new planting stabilizing support system that is not unsightly.

Yet another object of the invention is to provide a new planting stabilizing support system that after a period of time in which the planting becomes self-supporting, the stabilizing support system components deteriorate into the surrounding soil.

Another object of the invention is to provide a stabilizing support system that may be permanent, or may be removed and used again.

Another object of the invention is to provide a stabilizing support system concept that is applicable to small trees and shrubs, and equally applicable to larger plantings.

Another object of the invention is to provide a stabilizing support system that provides superior physical stabilization in comparison to conventional systems.

Another object of the invention is to provide a stabilizing support system that is comprised of materials which will benefit the planting and surrounding environment if left in the ground.

A further object of the invention is to provide a stabilizing support system that is quicker and easier to install than the conventional methods.

In one embodiment of the invention, with the problems of the prior art in mind, various objects of the invention are provided by a unique tree stabilizing device having a straight horizontal cross member, and a series of prongs perpendicularly depending from the horizontal cross member. The embodiment typically has two outer prongs, each attached to an end of the cross member, and at least one, but preferable two or more shorter inner prongs located near the middle of the cross member. The device is applied at the time of planting. After the root ball of the tree or shrub is set into an appropriate sized hole, the tree is positioned to the proper vertical position and correct orientation and the surrounding hole space is filled with soil, the tree stabilizing device is driven into the ground such that the outer prongs engage the firm undisturbed portion of the soil beyond the hole, and the inner prongs engage the root ball. The outer prongs are of a sufficient length to be held permanently and securely into the earth, and the shorter prongs are arranged both in position and length to engage the root ball securely. The tree stabilization device is typically driven into the earth deep enough so that the top most portion will be flush with the soil, thereby not becoming a tripping hazard, or being unsightly.

In applications requiring tree stabilization devices of greater strength and stability, the perpendicular prongs are attached to the horizontal member with triangular reinforcements, typically known as gusset plates. The addition of the gusset plates maintains the structural integrity of the device both during installation, and during its useful life, without detriment to performance. The two outside prong gusset plates may also be sized appropriately to help anchor the root ball in place, thereby providing an additional source of stability for the tree or shrub.

In applications requiring enhanced stability, triangular shaped arrowheads, either with or without rear projecting barbs are added. The addition of the triangular shaped barbed arrowheads, reduces the potential for the tree stabilization device to work loose. Bending the barbs on each arrowhead approximately thirty degrees from the vertical plane of the arrowhead provides a twisting bias during insertion and results in increased retention in the soil.

Typically, the present tree stabilization devices are driven into position by pounding them into the ground with mallets, sledge hammers or other appropriate sources of impact. Optionally, the horizontal cross member may have flat impact surfaces on the top, directly above the points where the prongs are attached, to provide a surface where the impact is applied. By locating the impact surfaces directly axially in line with the prongs, the impact is applied in the most efficient manner to drive the tree stabilization device into position, with the least amount of distortion, or damage. It is preferable to locate the straight horizontal cross member between the source of impact and the inner and outer prongs, so that the impulse applied during installation will not tend to break the welds.

In a second embodiment, the tree stabilization device horizontal cross member may be curved in the shape of an inverted U, with the ends of the U attached to the sides of two elongated end prongs. In this embodiment, impact may be applied directly to the prong's upper ends. Gusset plates, and arrowheads may be included the second embodiment.

In a third embodiment, two tree stabilization devices of the type described above in the first or second embodiment, may have their horizontal cross members joined at their midpoints, crossing perpendicularly, to form a compound tree stabilization device. In a typical application of this embodiment, two compound tree stabilization devices may be installed on either side of a large tree or shrub to provide increased stability.

In all of the embodiments described, the tree stabilization devices may consist of material such as iron, steel, or other metal free of harmful platings or coatings. In applications where iron or steel tree stabilization devices are used, the iron oxide which forms as the devices oxidize over time, may be beneficial to the soil. Typically, an inexpensive material such as a reinforcement bar (rebar) is used. Other suitable materials may also be used. The primary method of construction is welded joints.

BRIEF DESCRIPTION OF THE DRAWINGS

The various embodiments of the invention are described in detail below with reference to the drawings, in which like items are identified by the same reference designation, wherein.

DETAILED DESCRIPTION OF THE DESCRIPTION

Figure 1:
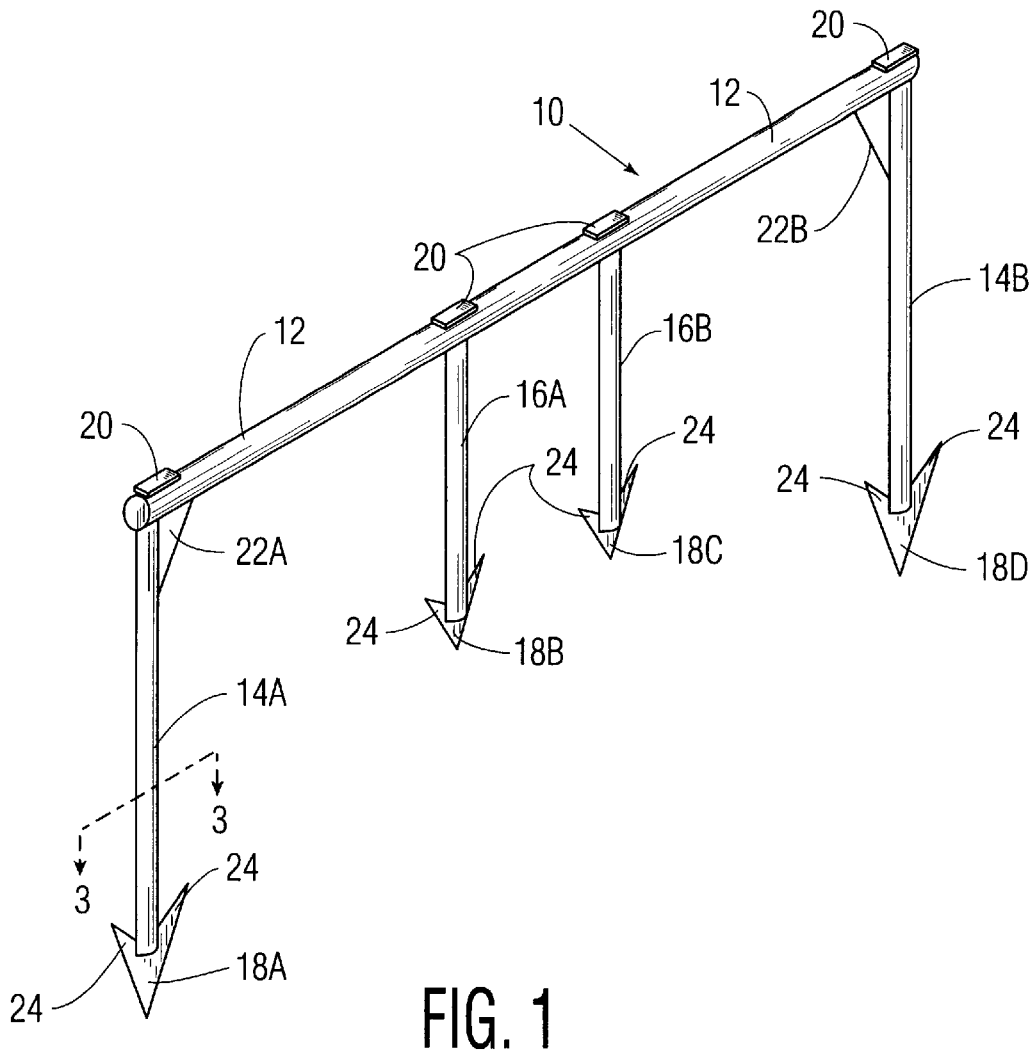
FIG. 1 is a pictorial view of one embodiment of the invention providing a tree stabilization device having two end prongs and two inner prongs, and a straight horizontal cross member.

FIG. 1 shows a preferred embodiment of tree stabilization device 10. The straight horizontal cross member 12 has two outer prongs 14A and 14B attached to the ends of cross member 12, and reinforced by triangular gusset plates 22A and 22B. Two shorter inner prongs 16A and 16B are attached near the middle of cross member 12. Triangular shaped arrowheads 18A, and 18D are attached to the lower ends of outer prongs 14A and 14B. Arrowheads 18B and 18C are attached to the lower ends of inner prongs 16A and 16B. The horizontal cross member 12 has a flat impact surface 20 located directly above each of the prongs. Each of the arrowheads 18 has rear projecting barbs 24.

Figure 2:
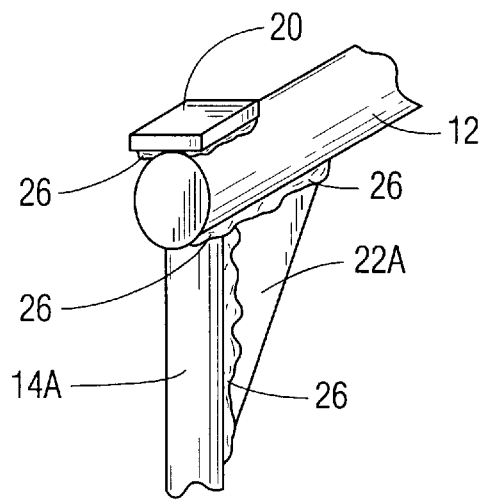
FIG. 2 illustrates a detailed view of the assembly of the tree stabilization device, where an outer prong attaches to the straight horizontal cross member.

FIG. 2 illustrates a detailed view of the tree stabilization device assembly where outer prong 14A attaches to cross member 12. Typical welds 26 are shown where the impact surface 20, and the gusset plate 22A are connected to the cross member 12, and the prong 14A.

Figure 3:
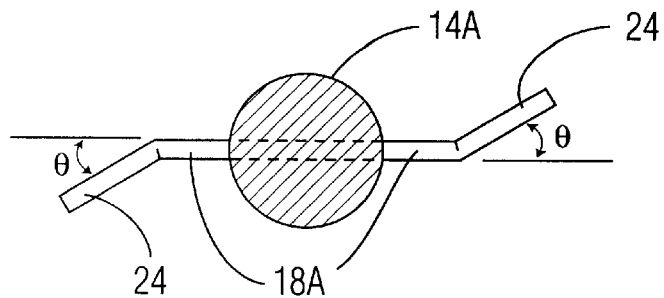
FIG. 3 illustrates a cross-sectional view taken along 3—3 of an outer prong showing the rear of a barbed arrowhead bent approximately thirty degrees off axis.

FIG. 3 illustrates the cross-sectional view 3—3, downward along outer prong 14A. Arrowhead 18A is viewed from the rear with barbs 24 bent approximately thirty degrees off axis, as indicated by the angle $\theta$.

Figure 4:
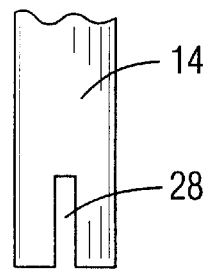
FIG. 4 shows a detail of the lower end of a prong having slots for receiving the arrowheads.

As shown in the exploded view of FIG. 4, the lower end of prong 14 includes a slot 28 for receiving arrowhead 18.

Figure 5:
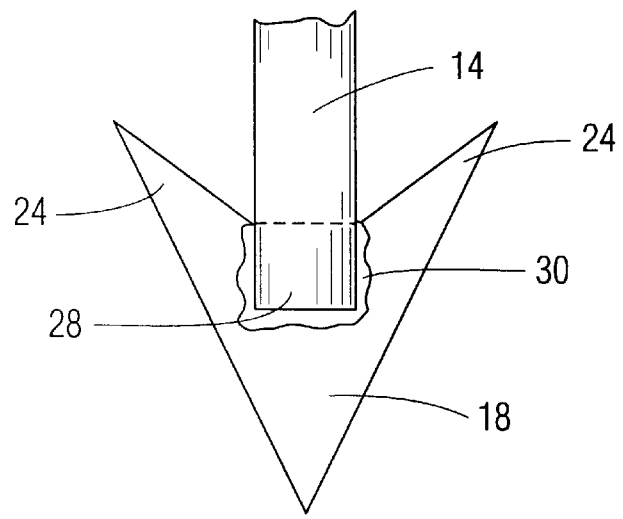
FIG. 5 shows a detail of a typical assembled arrowhead on an inner or outer prong.

An enlarged view of a typical arrowhead 18 assembled on prong 14 is shown in FIG. 5. In this embodiment the arrowhead is located within slot 28 and retained by weld 30.

Figure 6:
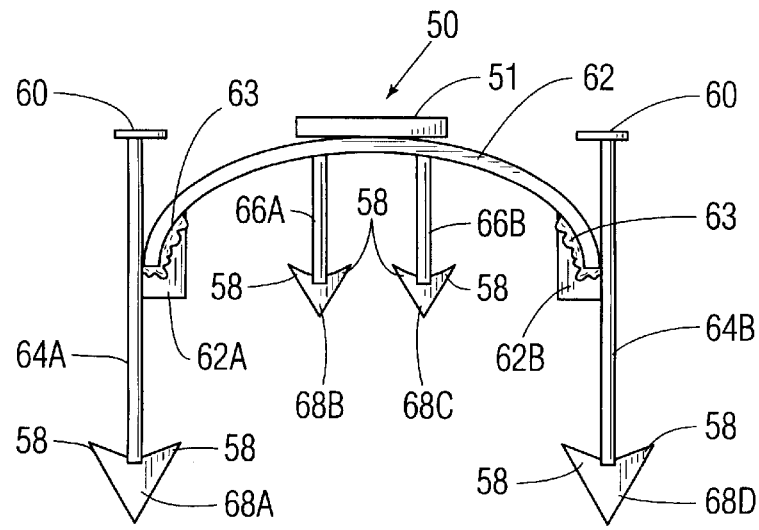
FIG. 6 shows an alternative embodiment of the tree stabilization device having a curved U-shaped horizontal cross member, two outer prongs, and two shorter inner prongs.

In FIG. 6, an alternative embodiment of the invention, is provided by a tree stabilization device 50 that includes a U-shaped horizontal cross member 62, a rectangular impact plate 51, and two outer prongs 64A and 64B attached to the ends of cross member 62. The joints between the outer prongs 64A and 64B and the cross member 62 are reinforced by rectangular gusset plates 62A and 62B, all of which are joined together by welds 63. Two shorter inner prongs 66A and 66B are attached near the middle of cross member 62. Triangular shaped arrowheads 68A and 68D are attached to the lower ends of outer prongs 64A and 64B, and arrowheads 68B and 68C are attached to the lower ends of inner prongs 66A and 66B. Outer prongs 64A and 64D each have a flat impact surface plates 60 located at their respective top ends. Each of the arrowheads 68A–68D has rear projecting barbs 58.

Figure 7:
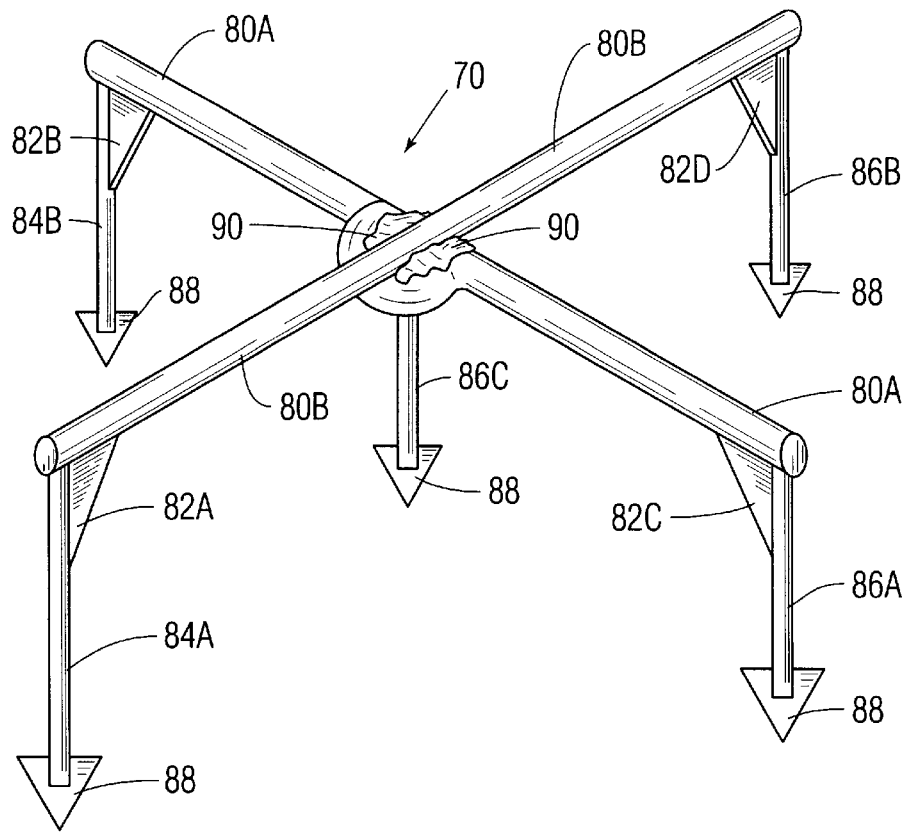
FIG. 7 shows a pictorial view of an embodiment of a compound tree stabilization device having two perpendicular horizontal cross members, outer prongs attached to the ends of the cross members, and a shorter inner prong depending from the junction of the cross members.

FIG. 7 shows an embodiment of a compound tree stabilizing device 70. Two perpendicular horizontal cross members 80A and 80B are joined together at their midpoints by weld 90. Two outer prongs 84A and 84B are attached to the ends of the cross members 80A and 80B respectively, and the joint is strengthened by triangular gusset plates 82A and 82B. Two shorter outer prongs 86A and 86B are attached to the opposite ends of cross members 80A and 80B, and are reinforced by triangular gusset plates 82C and 82D. A third shorter inner prong 86C depends from the junction of cross members 80A and 80B. Triangular shaped arrowheads 88 are attached to the lower ends of outer prongs 84A and 84B, and prongs 86A, 86B and 86C.

Figure 8:
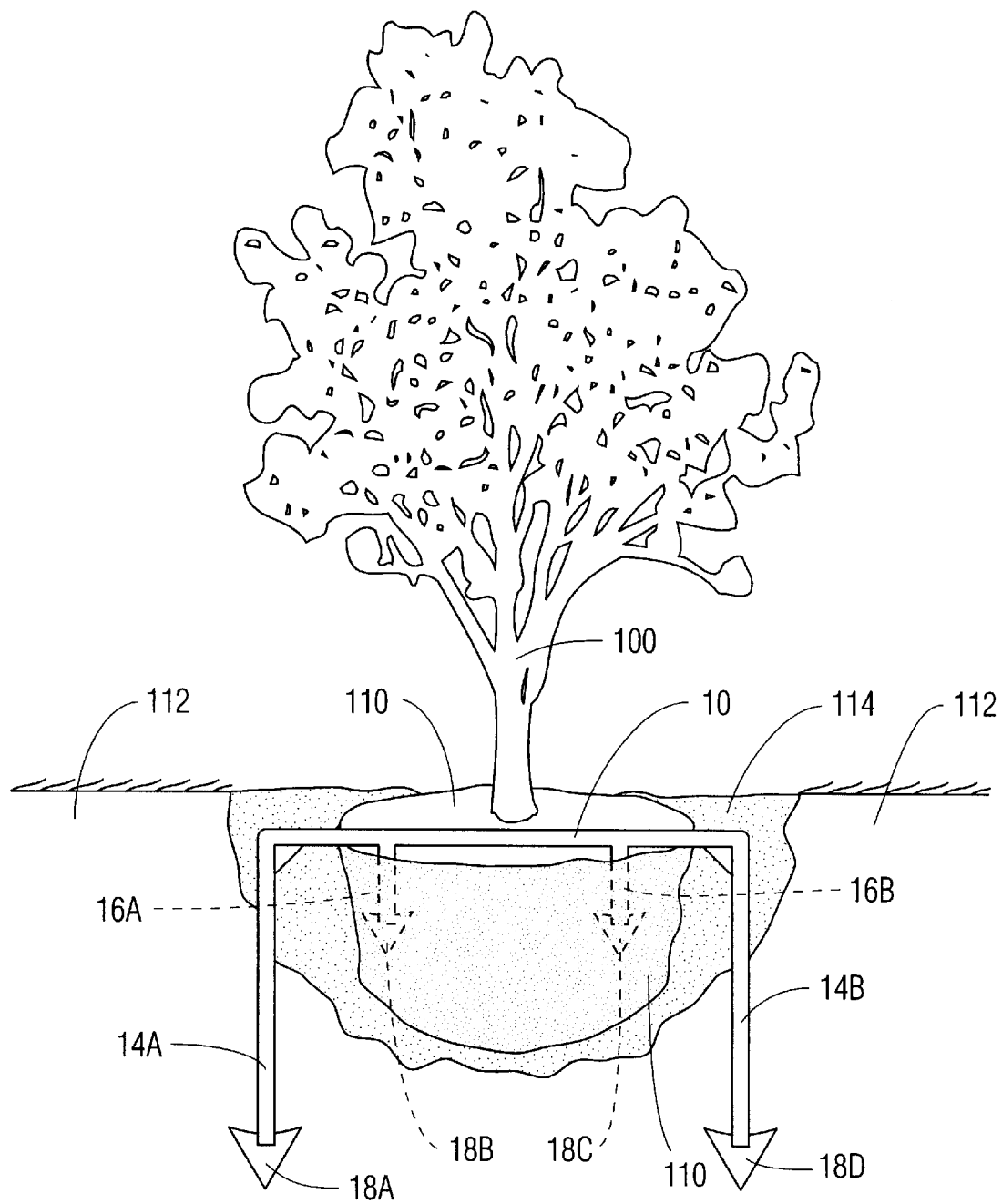
FIG. 8 shows a newly planted tree stabilized by a present tree stabilization device.

In FIG. 8, a tree stabilization device 10 is positioned for stabilizing a newly planted tree 100. The two inner prongs 16A and 16B penetrate the associated root ball 110. Arrowheads 18B and 18C are located substantially within root ball 110 for sufficient stability. The two outer prongs 14A and 14B extend through and beyond the fill dirt 114, and are engaged deep within the surrounding undisturbed soil 112, such that arrowheads 18A and 18D maintain the tree stabilization device 10 substantially in place.

Figure 9:
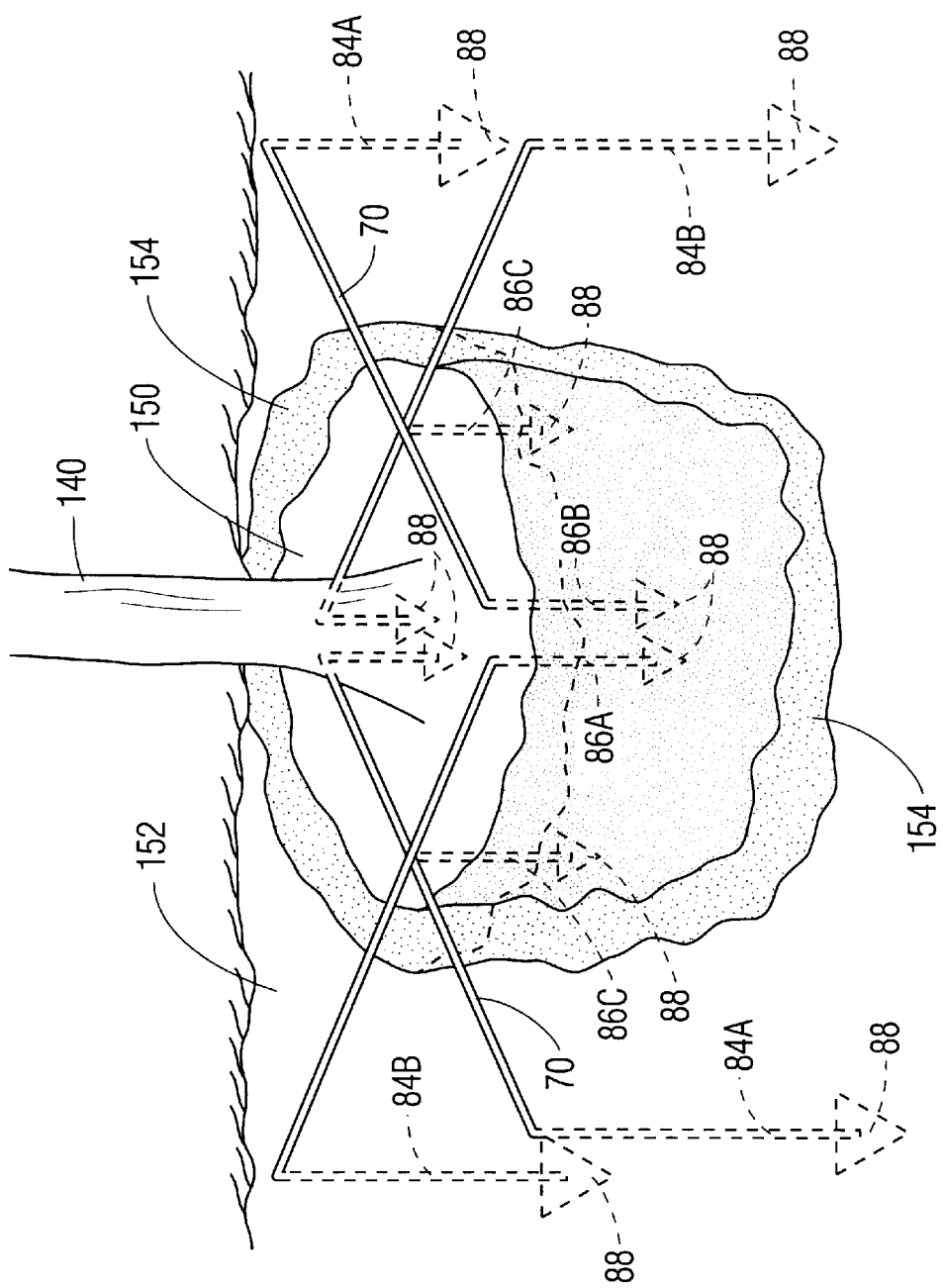
FIG. 9 shows a newly planted tree stabilized by two compound tree stabilization devices.

In FIG. 9, two compound tree stabilization devices 70 are used to secure a newly planted tree 140, having root ball 150. The root ball 150 is separated from undisturbed soil 152, by fill dirt 154. In each compound tree stabilization device 70, two outer prongs 84A and 84B extend beyond the fill dirt 154, and are retained within undisturbed soil 152, while inner prongs 86A, 86B, and 86C, together with their arrowheads 88 are located substantially within root ball 150.

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. A staple for stabilizing a tree or shrub root ball in a hole, comprising:
    a central cross member having a first end and a second end;
    a first prong having a top end and a bottom end, said top end of said first prong joined to said central cross member first end;
    a second prong having a top end and a bottom end, said top end of said second prong joined to said central cross member second end;
    at least one intermediate prong having a top end and a bottom end, the top end of said intermediate prong joined to an interior portion of said cross member;
    all of said prongs being parallel to one another and perpendicular to said cross member, and all said prongs lying in the same plane; and
    wherein the length of each of said first and second prongs is dimensioned to be firmly retained in undisturbed soil surrounding the hole and the length of said at least one intermediate prong(s) is dimensioned to firmly engage the root ball.

2. The staple of claim 1, further including a plurality of spaced apart intermediate prongs.

3. The staple of claim 1, further including arrowheads affixed to the bottom ends of each prong.

4. The staple of claim 1, wherein gusset plates are rigidly secured at the joints of said first, second, and at least one intermediate prongs and said central cross member.

5. The staple of claim 1, wherein said central cross member has a top surface, a plurality of flat impact surfaces disposed upon said top surface, and said impact surfaces being located directly above and centered on the axis of said first, second, and at least one intermediate prongs.

6. The staple of claim 1, wherein said central cross member has a straight rod-like structure.

7. The staple of claim 1, wherein said central cross member is curved.

8. The staple of claim 1, wherein said cross member, and first, second, and at least one intermediate prongs consist of metal material.

9. The staple of claim 8, wherein the metal is a ferrous metal.

10. The staple of claim 9, wherein the ferrous metal is reinforcing bar.

11. The staple of claim 10, wherein said first, second, and intermediate prongs, said central cross member, said gusset plates, and said arrowheads are affixed by welds.

12. A method for stabilizing a newly planted tree or shrub comprising the steps of:
    forming a staple including:
        a central cross member having a first end and a second end;
        a first prong having a top end and a bottom end, said top end of said first prong joined to said central cross member first end;
        a second prong having a top end and a bottom end, said top end of said second prong joined to said central cross member second end;
        at least one intermediate prong having a top end and a bottom end, the top end of said intermediate prong joined to an interior portion of said cross member; and
        all of said prongs being parallel to one another and perpendicular to said central cross member, and all of said prongs lying in the same plane;
    digging a hole in the ground large enough to accept the root ball of said tree or shrub;
    placing the root ball into the hole, and positioning the tree or shrub in a desired orientation;
    filling the space between the root ball and the ground with fill dirt;
    positioning at least one said staple such that the two longer perpendicular projecting prongs attached at each end of the central cross member impinges the undisturbed soil, while the middle perpendicular projecting prongs are directly above the root ball and oriented to impinge as much of the root ball as possible
    driving the longer prongs of the staple into the ground, and the shorter prongs into the root ball until the central cross member, and all other projections from the staple are flush with the ground level.

* * * * *